United States Patent
Zenz

(10) Patent No.: US 10,408,291 B2
(45) Date of Patent: Sep. 10, 2019

(54) BRAKE DISK COMPRISING COOLING ELEMENTS

(71) Applicant: Siemens AG Oesterreich, Vienna (AT)

(72) Inventor: Ruediger Zenz, Graz (AT)

(73) Assignee: Siemens Mobility GMBH, Vienna (AT)

( * ) Notice: Subject to any disclaimer, the term of this patent is extended or adjusted under 35 U.S.C. 154(b) by 0 days.

(21) Appl. No.: 15/106,590

(22) PCT Filed: Nov. 27, 2014

(86) PCT No.: PCT/EP2014/075777
§ 371 (c)(1),
(2) Date: Jun. 20, 2016

(87) PCT Pub. No.: WO2015/090890
PCT Pub. Date: Jun. 25, 2015

(65) Prior Publication Data
US 2017/0002880 A1    Jan. 5, 2017

(30) Foreign Application Priority Data
Dec. 20, 2013   (AT) .................................. 50843/2013

(51) Int. Cl.
*F16D 65/02* (2006.01)
*F16D 65/12* (2006.01)

(52) U.S. Cl.
CPC ......... *F16D 65/128* (2013.01); *F16D 65/124* (2013.01); *F16D 2065/138* (2013.01);
(Continued)

(58) Field of Classification Search
CPC ...... F16D 65/12; F16D 65/123; F16D 65/124; F16D 65/128; F16D 65/847; F16D 2065/1316; F16D 2065/1328; F16D 2065/1344; F16D 2065/1384; F16D 2065/132; F16D 2065/1312;
(Continued)

(56) References Cited

U.S. PATENT DOCUMENTS 3,314,509 A    4/1967   Pelikan
3,530,960 A *  9/1970   Gronemann .......... F16D 65/124
                                                188/218 XL
(Continued)

FOREIGN PATENT DOCUMENTS

CH    652177 A5    10/1985
CN    201335114    10/2009
(Continued)

OTHER PUBLICATIONS

English machined translation of DE-4437331 (Feb. 1996).*
English machined translation of DE-9319490 (Mar. 1994).*

*Primary Examiner* — Robert A. Siconolfi
*Assistant Examiner* — San M Aung
(74) *Attorney, Agent, or Firm* — Cozen O'Connor

(57) ABSTRACT

A brake disk for mounting on a rail vehicle wheel that comprises a multitude of elongate cooling elements on one side, wherein a plurality of cooling elements are configured as transverse elements, and the size of the transverse elements is smaller in the radial direction than in the direction perpendicular to the radius of the brake disk at the location of the transverse element so as to reduce windage.

15 Claims, 2 Drawing Sheets

(52) U.S. Cl.
CPC .............. *F16D 2065/1328* (2013.01); *F16D 2065/1392* (2013.01)

(58) Field of Classification Search
CPC ..... F16D 2065/1332; F16D 2065/1392; F16D 65/092; F16D 2069/004; F16D 2250/0076; F16D 2200/003; B61H 5/00; F16F 65/121
USPC .................................................. 188/218 XL
See application file for complete search history.

(56) References Cited

U.S. PATENT DOCUMENTS

| | | | |
|---|---|---|---|
| 5,188,203 A | 2/1993 | Winter | |
| 5,429,214 A * | 7/1995 | Wiebelhaus | F16D 65/123 |
| | | | 188/218 XL |
| 6,193,023 B1 | 2/2001 | Telfer | |
| 7,032,724 B1 * | 4/2006 | Hulten | F16D 65/128 |
| | | | 188/18 A |
| 9,709,110 B2 * | 7/2017 | Sabeti | F16D 65/128 |
| 2004/0124046 A1 * | 7/2004 | Hayes | F16D 65/0006 |
| | | | 188/218 XL |
| 2004/0178029 A1 * | 9/2004 | Hoyte | F16D 65/12 |
| | | | 188/218 XL |
| 2010/0283276 A1 * | 11/2010 | Wirth | F16D 65/12 |
| | | | 295/7 |
| 2011/0214950 A1 * | 9/2011 | Fujimoto | B61H 5/00 |
| | | | 188/218 XL |
| 2013/0284548 A1 * | 10/2013 | Guether | B32B 18/00 |
| | | | 188/218 XL |
| 2015/0232108 A1 * | 8/2015 | Mosbach | B61H 5/00 |
| | | | 188/218 XL |
| 2016/0076613 A1 * | 3/2016 | Boffelli | F16D 65/121 |
| | | | 188/218 XL |

FOREIGN PATENT DOCUMENTS

| | | | | |
|---|---|---|---|---|
| CN | 102803777 | | 11/2012 | |
| CN | 103016578 | * | 4/2013 | |
| CN | 103016578 A | * | 4/2013 | |
| DE | 901870 C | | 1/1954 | |
| DE | 1221664 B | | 7/1966 | |
| DE | 2921887 A1 | | 1/1980 | |
| DE | 4131519 A1 | | 4/1992 | |
| DE | 4210448 | | 10/1993 | |
| DE | 4210449 A1 | | 10/1993 | |
| DE | 9319490 U1 | * | 3/1994 | ............ F16D 65/121 |
| DE | 9319490 U1 | * | 3/1994 | ..... F16D 2065/1312 |
| DE | 9319490 U1 | * | 5/1994 | ............ F16D 65/121 |
| DE | 4437331 A1 | * | 2/1996 | ............ F16D 65/123 |
| DE | 19822577 | | 12/1999 | |
| DE | 202008008478 U1 | | 1/2009 | |
| DE | 102008003923 A1 | | 7/2009 | |
| DE | 102009027116 A1 | | 12/2010 | |
| DE | 202009013476 U1 | | 2/2011 | |
| EP | 0170298 A1 | | 2/1986 | |
| EP | 0211304 A1 | | 2/1987 | |
| EP | 0211304 B1 | | 6/1990 | |
| FR | 1048935 A | | 12/1953 | |
| GB | 1171718 A | * | 11/1969 | ............ F16D 65/124 |
| GB | 1171718 A | * | 11/1969 | ............ F16D 65/124 |
| GB | 2060096 | | 4/1981 | |

\* cited by examiner

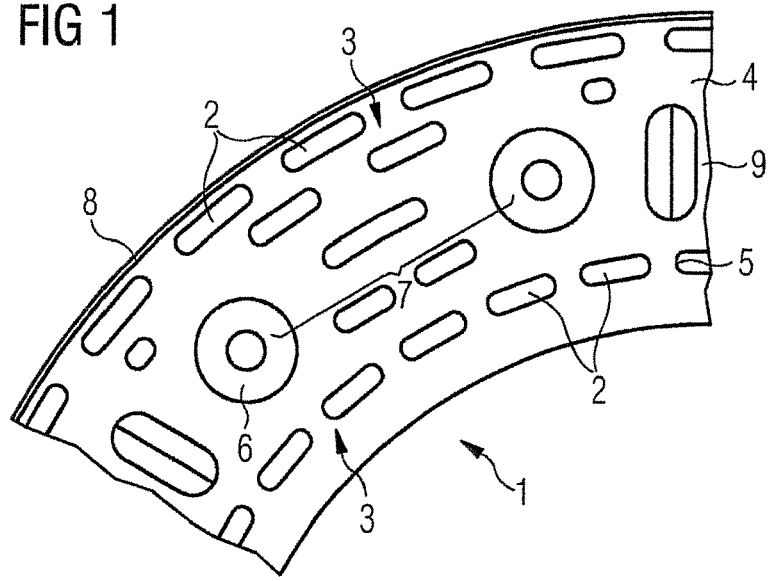
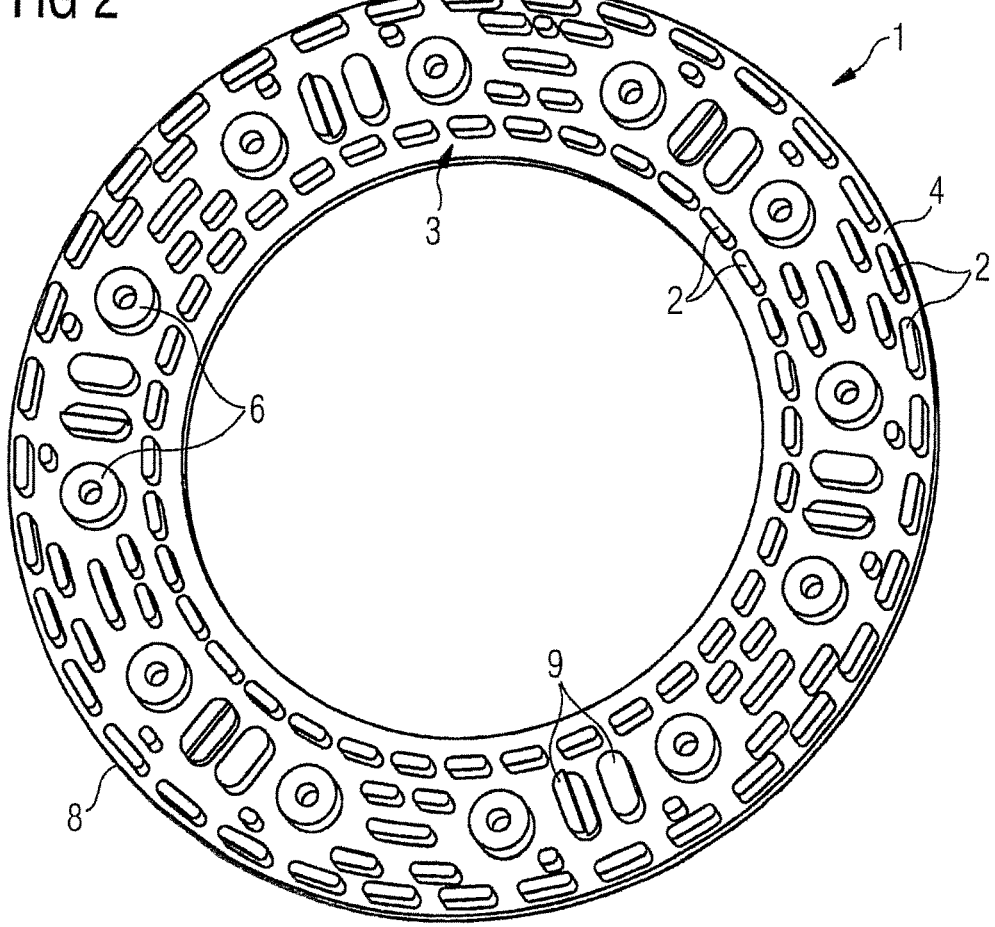

BRAKE DISK COMPRISING COOLING ELEMENTS

CROSS-REFERENCE TO RELATED APPLICATIONS

This is a U.S. national stage of application No. PCT/EP2014/075777 filed 27 Nov. 2014. Priority is claimed on Austrian Application No. A50843/2013 filed 20 Dec. 2013, the content of which is incorporated herein by reference in its entirety.

BACKGROUND OF THE INVENTION

1. Field of the Invention

The invention relates to a brake disk for fastening to a rail vehicle wheel, where the brake disk comprises a plurality of elongated cooling elements on one side.

In this case, only one brake disk may be provided on one side of a wheel or two brake disks may be respectively provided, with one on each side of the wheel. Moreover, a plurality of concentric brake disks on one or on both sides of the wheel is conceivable, because the brake disks have a generally circular shape.

The wheel in rail vehicles is generally configured as a solid wheel, i.e., a disk wheel. In rail vehicles, the wheel body comprises the wheel web and the wheel hub and the brake disk is generally fastened to the wheel web. The invention is not limited, however, to an application in solid wheels.

2. Description of the Related Art

Generally, in rail vehicles a plurality of braking systems is used and a brake control unit coordinates the interaction of all of the braking systems. The most important braking system in this case is the friction brake. This friction brake converts the kinetic energy of a rail vehicle into heat via two friction partners. The friction partners in high-speed trains are generally brake disks made of steel and brake linings made of sintered metal but other materials may also be used.

The brake disks in this case may be designed as wheel brake disks. The braking moment is transmitted from the brake disk to the wheel.

During a braking procedure, a very high level of power is introduced by friction into the brake disk in the form of heat and this heat must be subsequently dissipated because otherwise overheating of the friction partners may result.

Hitherto, this problem was solved by one side of the brake disk comprising cooling elements. These cooling elements are designed as radial cooling ribs and extend radially over the entire brake disk, as disclosed in DE 102008003923 A1. However, windage is produced by these cooling ribs, where the windage needs to be compensated for by greater driving power.

A drawback with the disclosed brake disk comprising the radial cooling ribs, therefore, is that the windage is reflected in an increased energy requirement during the forward motion of the associated train relative to trains comprising brake disks without cooling ribs.

SUMMARY OF THE INVENTION

It is an object of the present invention to provide a brake disk by which the heat introduced into the brake disk may be discharged as a flow of heat to the ambient air, where the windage is lower than in the brake disk comprising conventional radial cooling ribs.

This and other objects and advantages are achieved in accordance with the invention by a brake disk for fastening to a rail vehicle wheel, wherein the brake disk comprises a plurality of elongated cooling elements on one side, where a plurality of the cooling elements are configured as transverse elements, the size thereof being smaller in the radial direction than perpendicular to the radius of the brake disk at the location of the transverse element. Using a configuration comprising a plurality of elongated cooling elements that are no longer radially aligned, but the component thereof perpendicular to the radial direction is greater than that in the radial direction, the ratio of the flow of heat to windage is improved because the air is unable to flow, as rapidly outward in the radial direction. The transverse elements facing in the circumferential direction, i.e., also configured as cooling ribs, during the movement of the brake disk around the wheel axle, additionally permit air contact to be produced without a high level of air turbulence.

In particular, it may be provided that the transverse elements are aligned tangentially. In this case, "tangentially" is to be understood as relating to a circle that is concentric relative to the brake disk and that is in contact with the transverse element.

The orientation of the elongated cooling elements that are generally configured as cooling ribs, relative to the radius of the brake disk, in the case of linear cooling elements (rectangular, elliptical), is determined according to the orientation of the longitudinal axis thereof and in the case of curved cooling elements (for example an airfoil profile) is determined according to the outer contour thereof on the longitudinal sides.

In a further embodiment of the brake disk in accordance with the invention, a plurality of transverse elements is arranged with a spacing from one another on a circle. These spacings permit the air to move radially outwardly between the transverse elements and thus to ensure optimal contact for the transmission of the flow of heat. The ratio of the mutual spacing between two transverse elements along the circle relative to the length of the transverse elements is not as crucial as the fact that the flow cross section should be approximately constant over the radius or should be enlarged, i.e., that successive rows and/or circles of transverse elements in the radial direction open up flow channels that do not become substantially narrower in the radially outward direction but instead become broader. The latter has the effect that, for example, the mass flow through the flow channels remains constant as the air expands by heating on the transverse elements.

The mass of the brake disk may also be reduced via a plurality of transverse elements spaced apart from one another, instead of a continuous cooling rib.

In a particularly preferred embodiment of the brake disk in accordance with the invention, all of the cooling elements arranged on a circle are configured as transverse elements. This embodiment presents less windage and thus provides a lower energy consumption of the train than the hitherto known brake disk with radial cooling ribs.

If the cooling elements arranged on a circle were not all transverse elements, radial cooling ribs, fastening portions and/or centering elements may also be provided between the transverse elements. As a result, it is possible to integrate elements that have different functions, such as the fastening of the brake disk to the wheel.

In a particularly preferred embodiment of the brake disk in accordance the invention, the transverse elements located furthest to the inside are shorter than the transverse elements located furthest to the outside. Longer transverse elements take into account the air that flows around the transverse elements and expands due to the heating.

In a further embodiment of the brake disk in accordance with the invention, the transverse elements are shorter than the radial width of the brake disk by at least 60%, in particular by 90%. The length of the transverse elements, therefore, is only at most 40%, in particular only at most 10%, of the radial width of the brake disk (the width of the annulus that forms the brake disk). The inventive idea is that, by taking into consideration the heated air, the mass flow across the radius remains approximately constant, i.e., the flow channels that are formed by the intermediate spaces of the transverse elements, preferably widen radially outwardly.

Typical dimensions of the cooling ribs formed as transverse elements are a length of 20-60 mm, a width of 8-15 mm and a height of 20-30 mm.

A further preferred embodiment of the brake disk in accordance with the invention, the cross section of the transverse elements is configured to be rectangular with rounded corners or ovoid (e.g., elliptical) in a section parallel to the plane of the brake disk. Here, it is also possible that the shape of the transverse element follows the path of a circle upon which the transverse element is located, i.e., is in the shape of a circular-arc. Alternatively, the transverse element has a curved shape that differs from the circular-arc shape, i.e., an airfoil profile. An elongated and rounded shape at the corners provides a lower air resistance that is translated into a lower energy consumption.

In one specific embodiment, at least one transverse element is configured as an annulus that is concentric relative to the brake disk. Therefore, a transverse element having a maximum length is provided and/or a specific example is provided of a plurality of transverse elements that are arranged on a circle and in the circumferential direction are not spaced apart from one another but merge with one another.

In a further embodiment of the brake disk in accordance with the invention, the brake disk comprises fastening portions for fastening to a rail vehicle wheel. With these fastening portions the brake disk may be fastened in a stable manner, such as to the rail vehicle wheel.

In a preferred embodiment of the brake disk in accordance with the invention, the fastening portions are arranged with a spacing from one another on a circle, where one or more centering elements are provided between two fastening portions. The centering elements serve to guide the brake disk in corresponding counter-parts on the rail vehicle wheel in the radial direction.

In a further embodiment of the brake disk in accordance with the invention, the transverse elements that are arranged on adjacent circles are offset relative to one another in the circumferential direction. This permits a high level of heat transfer with low windage at the same time. As a result, paths or flow channels for the air flow may be formed between the transverse elements, where the paths or flow channels are arranged at an angle of between 0 and 90°, in particular between 30 and 60°, relative to the radial direction.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For the further description of the invention, reference is made in the following part of the description to the figures, further advantageous embodiments, details and developments of the invention being able to be derived therefrom. The drawings are intended to represent the inventive idea but in no way to limit or even reproduce said inventive idea, in which:

FIG. 1 shows a schematic view of a detail of a brake disk in accordance with the invention comprising transverse elements having a substantially rectangular cross section;

FIG. 2 shows an axonometric view of the brake disk of FIG. 1;

DETAILED DESCRIPTION OF THE EXEMPLARY EMBODIMENTS

Figure 3:
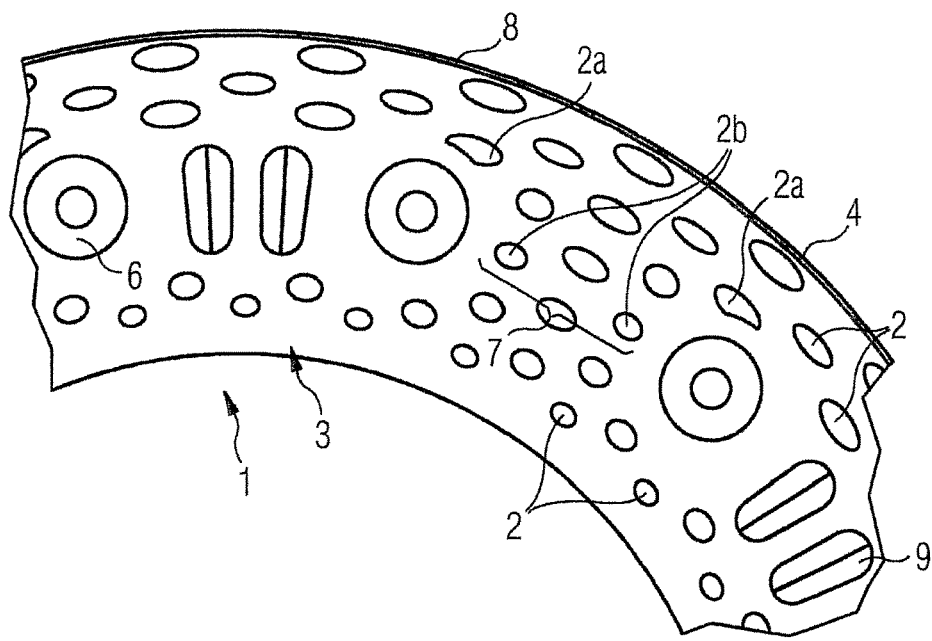
FIG. 3 shows a schematic view of a detail of a brake disk in accordance with the invention comprising transverse elements having a substantially elliptical cross section.
Figure 4:
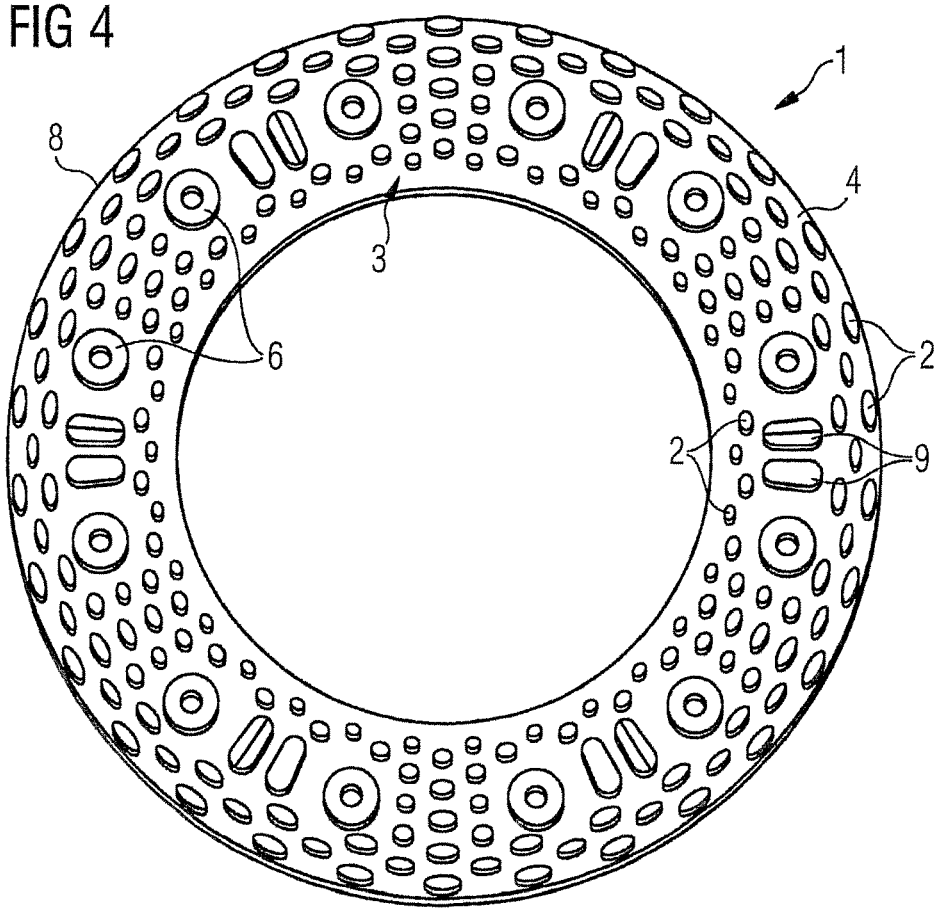
FIG. 4 shows an axonometric view of the brake disk of FIG. 3.

FIG. 1 shows approximately a sixth of a brake disk 1 in accordance with the invention comprising a plurality of transverse elements 2 as cooling elements, a plurality of centering elements 9 and a plurality of fastening portions 6. A surface 4 and an outer edge 8 of the brake disk 1 configured as an annulus may be seen. The tangentially aligned transverse elements 2, the radially aligned centering elements 9 and the fastening portions 6 are integrally formed on the surface 4, i.e., configured in one single piece with the brake disk 1. The cooling elements that are of an elongated configuration are aligned as transverse elements 2, such that the dimension in the radial direction is smaller than perpendicular to the radius.

In one section that is formed parallel to the surface 4 of the brake disk 1, within the plane of the section a rectangular shape is produced by the transverse elements 2, where the dimension thereof in the radial direction is smaller than perpendicular to the radius. In this case, the corners 5 are rounded.

On the surface 4 in the vicinity of the outer edge 8, the outermost transverse elements 2 are arranged along a circle. Here, one respective spacing 3 is located between the transverse elements 2. The transverse elements 2 arranged on the next circle located further toward the inside are arranged offset relative to the transverse elements 2 of the outermost path and therefore cover the spacing 3 in the radial direction, i.e., they are longer than the spacing between the outermost transverse elements. This continues substantially as far as the innermost circle of transverse elements 2.

The transverse elements 2 on the outermost circular path are configured longer than the transverse elements 2 on the innermost circular path. The transverse elements 2 located between the two circular paths are of different lengths, depending on the radial position. For the intermediate space 7 between two fastening portions 6 (provided no centering elements 9 are provided there) a transverse element 2 is provided, where the transverse element is longer than the transverse elements 2 located radially outwardly, as here no space is available for three correspondingly short transverse elements 2. The fastening portions 6 and/or also the centering elements 9 are intended to be spaced apart from the transverse elements 2.

The fastening portions 6 are configured as fastening eyes and are arranged at regular spacings from one another. This results in intermediate spaces 7 between the fastening portions 6. An intermediate space 7 with centering elements 9 and then an intermediate space 7 with the tangentially arranged transverse elements 2 are provided alternately.

The fastening portions 6, in this case, are circular and have an opening in the center. They are arranged radially centrally on the brake disk 1 in accordance with the invention. The fastening portions 6 may, however, also have shapes that differ from a circular shape.

In this case, the brake disk 1 in accordance with the invention is fastened to a rail vehicle wheel such that the surface 4 illustrated in FIG. 1 faces the rail vehicle wheel and the lower face, not visible in the illustration, serves as a frictional surface for the brake linings. Here, the top surfaces of the transverse elements 2, centering elements 9 and fastening portions 6 remote from the surface 4 are able to bear against the wheel body of the rail vehicle wheel and namely against the wheel web.

An entire brake disk configured in accordance with that depicted in FIG. 1 is shown in FIG. 2.

FIG. 3 corresponds in type to the view of FIG. 1 but the brake disk in FIG. 3 is principally provided with transverse elements 2 that have an oval (elliptical) cross section. In one section, which is formed parallel to the surface 4 of the brake disk 1, therefore, in the plane of the section, an elliptical shape is produced by the transverse elements 2.

Whilst in FIGS. 1 and 2, the transverse elements 2 always have a spacing from one another that is of such a size that a portion of the planar surface 4 is located therebetween, in FIGS. 3 and/or 4 the spacing of the transverse elements 2 at many locations is so small that a planar surface 4 is not located between the transverse elements.

For reasons of space, because a transverse element 2 with a fully elliptical cross section would not be sufficiently spaced apart from the fastening portion 6, some transverse elements 2a have an airfoil cross section and other transverse elements 2b have an ovoid cross section.

The transverse elements 2a having an airfoil cross section, in contrast to the remaining transverse elements 2, 2b, are not exclusively aligned tangentially but provided with a small radial component. Due to the arrangement of the transverse elements 2a symmetrically relative to the intermediate space 7, however, the brake disk 1 is able to be used equally in both rotational directions.

Moreover, the transverse elements 2b are always arranged in pairs and symmetrically relative to one another in the intermediate space 7, i.e., with the tip toward one another.

Thus, even non-symmetrical transverse elements 2a, 2b that have no inherent symmetry in the longitudinal direction thereof are arranged in pairs symmetrically relative to one another in the longitudinal direction thereof (relative to a specific radius as an axis of symmetry). For specific applications, however, transverse elements without inherent symmetry could also be arranged in the same direction, i.e., with translational symmetry.

Thus, while there have been shown, described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A brake disk for fastening to a wheel of a rail vehicle, comprising:
   a plurality of elongated cooling elements on one side of the brake disk, a plurality of said cooling elongated elements being configured as transverse elements, and a size of the transverse elements being smaller in a radial direction than perpendicular to the radius of the brake disk at a location of the transverse element;
   a plurality of fastening portions each of which fasten to the wheel of the rail vehicle, said plurality of fastening portions being circumferentially disposed around the brake disk; and
   centering portions circumferentially aligned with and adjacent to the fastening portions, said plurality of fastening portions and said centering portions being spaced apart from the plurality of transverse elements.

2. The brake disk as claimed in claim 1, wherein the transverse elements are aligned tangentially.

3. The brake disk as claimed in claim 1, wherein a plurality of transverse elements are arranged with a spacing from one another on a circle.

4. The brake disk as claimed in claim 2, wherein a plurality of transverse elements are arranged with a spacing from one another on a circle.

5. The brake disk as claimed in claim 3, wherein all of the cooling elements arranged on a circle are configured as transverse elements.

6. The brake disk as claimed in claim 1, wherein transverse elements located furthest to an inside of the brake disk are shorter than the transverse elements located furthest to an outside of the brake disk.

7. The brake disk as claimed in claim 1, wherein a cross section of the transverse elements has one of (i) a rectangular configuration with rounded corners or (ii) an ovoid in a section parallel to the plane of the brake disk configuration.

8. The brake disk as claimed in claim 1, wherein at least one transverse element is configured as an annulus that is concentric to the brake disk.

9. The brake disk as claimed in claim 1, wherein said plurality of fastening portions are each arranged with a spacing from one another on a circle; and wherein at least one centering element is provided between two fastening portions of the plurality of fastening portions.

10. The brake disk as claimed in claim 3, wherein the transverse elements arranged on adjacent circles are offset relative to one another in a circumferential direction.

11. The brake disk as claimed in claim 5, wherein the transverse elements arranged on adjacent circles are offset relative to one another in a circumferential direction.

12. The brake disk as claimed in claim 6, wherein the transverse elements arranged on adjacent circles are offset relative to one another in a circumferential direction.

13. The brake disk as claimed in claim 7, wherein the transverse elements arranged on adjacent circles are offset relative to one another in a circumferential direction.

14. The brake disk as claimed in claim 1, wherein the transverse elements arranged on adjacent circles are offset relative to one another in a circumferential direction.

15. The brake disk as claimed in claim 9, wherein the transverse elements arranged on adjacent circles are offset relative to one another in a circumferential direction.

\* \* \* \* \*